Patented Feb. 22, 1949

2,462,252

UNITED STATES PATENT OFFICE 2,462,252

PRODUCTION AND USE OF SYNTHETIC RESIN

Raymond G. Booty, Elmwood Park, Ill., assignor to Weyerhaeuser Timber Company, Tacoma, Wash., a corporation of Washington No Drawing. Application January 25, 1944, Serial No. 519,645

7 Claims. (Cl. 154—133)

The present invention relates to the manufacture of phenolic-aldehyde resins. It has special reference to the so-called water-soluble phenol-formaldehyde condensation products in liquid form for use in the production of solid resin by the action of heat to thermoset the material. In particular it relates to the production of an aqueous liquid solution containing a reactive phenolic resin which is capable of further and rapid condensation or reaction by the action of heat. It also relates to preparing such a resin so that it may be stored for long periods with liquid stability and with retention of its curing properties at high temperatures.

Among the "soluble" reactive resins are the so-called water-soluble phenolic-aldehyde condensation products. These are believed to exist in so-called solution in water in the form of a colloid, but for convenience they are herein termed as "water-soluble." As this type of resin material becomes further advanced towards an insoluble resin, as by long standing, or by the action of heat, a solution thereof becomes more viscous and approaches that point where the resin composition comes out of solution and precipitates or irreversibly gels with inclusion of its solvent. Such rapidly changing resin solutions are not suitable for many uses in the arts, where it is necessary to hold the resin in storage before use.

Certain conditions of use of such water-soluble resins, as for example, use as or in glues or liquid adhesives, call for suitable viscosity. One way heretofore employed for securing increased viscosity of such a water-soluble resin, is to advance the resin by heat. However, such advancement brings the resin closer to the said precipitation or gel point, and as a result the resin is relatively unstable, and less suitable for long storage.

It is a general object of the present invention to condense a phenol and an aldehyde in a liquid mass in the presence of a thickening agent dispersed in the said liquid mass.

It is also an object of the present invention to produce an aqueous solution of a phenol-formaldehyde condensation product which is reactive to provide solid resin, and to produce such solution by use of a special agent selected for giving it increased viscosity compared to the viscoscity which would otherwise result from the degree of advancement or polymerization of the resin content.

It is a particular object of the invention to effect the condensation of a phenol and an aldehyde in the presence of an agent which functions to increase the viscosity of a resulting solution.

It is also an object of the present invention to employ such an agent for effecting a desired viscosity, which agent does not impair, but rather contributes to the stability of the solution.

It is a particular object of the invention to employ polyvinyl alcohol as a thickening agent.

It is a further object of the invention to provide an aqueous resin-containing glue composition, particularly useful for the production of plywood.

It is also an object of the invention to produce plywood having a phenol-aldehyde resin as the essential element of the glue line.

Various other and ancillary objects and advantages of the present invention will become apparent from the following description and explanation of the present invention.

The said so-called water-soluble phenolic-aldehyde condensation products are preferably and most commonly produced by condensation of phenol and formaldehyde in aqueous solution in the presence of alkali as a catalyst. It is well-known that the proportion of phenol and formaldehyde, and the kind and quantity of alkali as catalyst, have definite effects upon the reaction, and upon the specific nature of the resulting condensation product. In general, where a low degree of advancement or polymerization of the resulting condensation product is desired, the resin solution has a comparably low viscosity, which viscosity can be increased by the action of heat to continue the advancement or polymerization. The amount of alkali residual to the reaction product is a sort of colloid-dispersing agent effective to keep the resin in dispersion or solution. Increase of the alkali content adds to the stability of the solution by bettering the dispersion.

It is appreciated that many hydrocolloid materials might be added to increase the viscosity of any particular solution, but where such solutions are subject to long storage, any such colloidal thickening agent must be one which is substantially resistant to change by the presence of the alkali contained in the solution.

I have found that when about 2 parts of polyvinyl alcohol per 100 parts of a phenol are employed in the alkaline condensation of a phenol and an aldehyde, the viscosity of the resulting solution may be made to be roughly about 8 times, for example, the viscosity of a solution prepared under similar circumstances but without using said polyvinyl alcohol. Only a small quantity of the polyvinyl alcohol is needed, and the quantity chosen determines the resulting increase of viscosity for a given advancement. More or less than 2 parts of any given form of polyvinyl alcohol per 100 of the phenol may be employed to give resultingly greater and less viscosity than corresponds to the use of said 2 parts.

The importance of higher viscosity for low degree of polymerization is reflected in the use of the resin solution as, or as a base in, a liquid glue for wood fibers, cellulose fibers, paper, cloth, wood and especially wood veneer in the production of plywood. In these arts a surface bond is most frequently desired, that is, localization of the ultimate resin in a resin layer as a bond, using a glue completely wetting the adjacent surfaces but with a minimum of penetration into the material to be bonded. The higher the viscosity of the solution, the less the penetration into a material normally capable of absorbing it. Thus, on heating, and on loss of water or other solvent liquid from the glue, whereby the resin solids become more concentrated, the bonding composition can pass through a fluid, plastic or flux stage, wherein it flows, and wets with lessened surface penetration, into the recesses of the areas to be bonded, finally arriving at a solid stage.

Heretofore, where higher degree of advancement has been employed to secure a considerable and suitable viscosity for application or for spreading of a resin-containing glue composition, with a minimum of penetration, the resin-containing glue composition has passed into the solid state in the process of becoming concentrated, and under circumstances such that it has failed properly to flow in its fluid state to give an adequate bond. Attempts heretofore to use a less advanced resin have resulted in too much penetration, or in a glue composition which is lacking in bonding power where it is so compounded as to have a suitable spreading quality. In many instances the resin has become located to a considerable extent within the materials to be bonded rather than largely at an interface of the bonded materials.

Numerous vinyl compounds readily polymerize into products of higher molecular weight, growing more viscous and resin-like as the molecular weight increases. The present invention employs polyvinyl compounds as thickening agents. Some polyvinyl compounds are affected by alkali, for example, polyvinyl esters are hydrolyzed to polyvinyl alcohol, yet the latter provides a suitable thickening agent for the purposes of the present invention.

Polyvinyl alcohol, as commonly provided in commerce, is prepared by hydrolyzing or saponifying polyvinyl acetate, and it frequently contains a small amount of polyvinyl acetate. Polyvinyl acetate is readily subject to saponification by alkali to provide polyvinyl alcohol. It is possible in the present invention to employ polyvinyl acetate as a raw material, or mixtures of it with polyvinyl alcohol. The quantity of alkali employed for the condensation of the phenol and formaldehyde may be increased, if desired, and in part serve to saponify all or any polyvinyl acetate or other polyvinyl ester so employed, thus to form polyvinyl alcohol. The saponification forms sodium acetate or other salt, which of course remains with the resin solution. In order to keep constant the alkali for the resin-forming reaction, extra alkali is preferably employed in amount to effect the desired saponification. This amount may be readily determined by titrating the available raw material containing polyvinyl acetate or other ester with caustic soda. Polyvinyl acetate has a saponification number of 600, while polyvinyl alcohol has a saponification number of 0. The commercial grades of polyvinyl alcohol which have been employed in the present invention in certain examples as hereinafter given have in actual practice exhibited a saponification number varying from 12 to 90.

The degree of polymerization of the vinyl compound has an influence upon the resulting increase in viscosity, the more highly polymerized compounds giving greater viscosity. Higher polymers permit lowering the reaction time, thus giving less degree of advancement or polymerization to the phenolic resin to be formed, or otherwise permitting a reduction in usage of vinyl compounds to achieve a desired viscosity in the final product. The following examples illustrate the invention; and throughout the examples parts are given by weight.

*Example I*

20 parts of polyvinyl alcohol (saponification number of 12 to 90) are added to 600 parts of formaldehyde a commercial solution of such compound in water (37% by weight). The polyvinyl alcohol is a powder material, and it is stirred into the formaldehyde solution until well dispersed therein. Then 1000 parts of phenol (M. P. 41° C.) are melted and added to the formaldehyde solution containing the polyvinyl alcohol. The mass is then heated to 40° C. at which temperature 30 parts of caustic soda are added in the form of a solution in water of 37% strength by weight, thus adding about 51 parts of water.

The reaction mass is then heated to 80° C. during a heating period of about 105 minutes. The temperature of 80° C. is maintained until a specimen of the resin withdrawn and tested at 25° C., exhibits a viscosity of 1200 to 1300 centipoises. The holding time for such result will be in the vicinity of about 4 hours. At this end point, the resin is cooled to 60° C. at a rate of about 70° C. per hour, during which time the viscosity will increase by continued reaction by about 100 centipoises measured at 25° C. At 60° C., or below, there is added to the reaction mass 30 parts of caustic soda in the form of a 37% by weight solution having 51 parts of water, which adds about 150 centipoises to the viscosity measured at 25° C. The resin solution thus obtained is cooled to 40° F. adding another about 50 centipoises likewise measured, and is stable for long periods, in some cases even for approximately one year, without precipitation or gelling and without appreciable change in viscosity. Thus the final viscosity will be from 1500 to 1600 centipoises measured at 25° C.

In the foregoing example the formaldehyde solution employed is commercial formalin, containing about 7% of methanol by weight, and a small percentage, for example .005 to 1%, of formic acid by weight. The alkali employed in the reaction mixture is in part utilized to neutralize said formic acid, and to saponify a small amount of polyvinyl acetate present in said commercial polyvinyl alcohol, as represented by the saponification number 12 to 90.

The presence of salts such as sodium formate and sodium acetate in the resulting resin solution increases the tendency for the resin to precipitate or gel from its sol condition when it arrives at a suitable stage of advancement under any circumstances. The additional caustic soda employed at the end of the reaction acts as additional dispersing agent, in part to counteract the various tendencies leading toward early precipitation or gelling.

*Example II*

The following materials are employed: 1000 parts of U. S. P. phenol (M. P. 40° C.), 600 parts of formaldehyde in the form of a water solution of such compound at 37% formaldehyde by weight (contains 6 to 8% by weight of methanol), 20 parts of polyvinyl alcohol (commercial grade 95% purity), and 55+ parts of caustic soda (as a 37% by weight solution in water). The above described polyvinyl alcohol is subject to a content of polyvinyl acetate, which latter is readily hydrolyzed to polyvinyl alcohol by the addition of alkali such as caustic soda.

In carrying out the process, the powder-form polyvinyl alcohol is added to the formaldehyde solution and thoroughly dispersed therein. Then small quantities of caustic soda solution are added to saponify any polyvinyl acetate, the addition being continued until the pH of the liquid is 7. The amount of caustic soda so introduced may vary according to the saponification number of the polyvinyl alcohol material which amount so used represents the "plus" symbol used in the quantity listing above.

The phenol is melted, and at a temperature of about 50° C. it is added to the formaldehyde solution. Then 45 parts of caustic soda are added as a 37% solution in water. The temperature is allowed to rise to 80° C. by suitable control during a time of about 1 hour and 30 minutes, and held at 80° C. until a sample withdrawn and tested at 25° C. has a viscosity of 1300 centipoises. When this condition of viscosity is achieved the reaction mass is cooled to 60° C. as in Example I, and 10 parts of caustic soda are added as a 37% solution in water. The resin is now complete, and is cooled to 40° F. and maintained until used. At this temperature the resin remains as a stable liquid for times up to at least one year.

*Example III*

The following materials are employed: 1000 parts of U. S. P. phenol (M. P. 40° C.), 90 parts of polyvinyl acetate, 155.5 parts of caustic soda (in 37% solution in water), and 600 parts of formaldehyde in the form of an aqueous solution of it at 37% by weight (contains also 6 to 8% by weight methanol).

The phenol is heated to 80° C. and the powder-form of polyvinyl acetate is dissolved therein. Then the 99.5 parts of caustic soda are added. Following this the formaldehyde solution is added and reaction is carried out for 4 hours at 60° C., then at 80° C. for one hour and more and until a removed specimen has a viscosity of 1300 centipoises at 25° C. The reaction is stopped, and the cooling procedure set forth in Example I is followed with the addition of 56 parts of caustic soda as a stabilizing agent.

In the foregoing, a portion of the original caustic soda is effective to saponify the polyvinyl acetate to provide polyvinyl alcohol. Additional caustic soda for stabilizing is herein employed in order to counteract the adverse effect of the formed sodium acetate upon the stability of the solution.

The well-known variations of the condensation may be applied in the above and in other examples of the condensation. For example, when the catalytic alkali is reduced in quantity, a longer time of reaction is required, and the difference may be added later to attain long-time liquid stability. When formaldehyde is decreased in quantity a longer reaction time is required to reach a comparable viscosity, but lowered liquid stability and property changes are encountered; for example, when a glue is made from such a resin for plywood as hereinafter described, increased penetration of the applied resin is encountered during pressing.

When formaldehyde is increased, the content of free or uncombined formaldehyde may become excessive, and such cases may be troublesome in some uses of the resin, as for example by being liberated as free formaldehyde gas in final heating to set the resin. The preferred ratio of phenol to formaldehyde is that given above, being substantially one mole of phenol to 1.87 moles of formaldehyde. 100 parts by weight of phenol correspond to 1.06 molar weights.

Resin solutions such as are produced by the above examples are especially suitable for compounding glues for use in producing plywood. In such art, economy of resin base is a commercial objective. This leads to thin but even spreading and to minimizing of penetration into the wood veneer. Spreading involves initial application of a liquid glue to a veneer, followed by flow or distribution between superposed plies under heat and pressure as the setting of the resin is accomplished, while retaining flowing properties in the glue for a time suitable to permit its interfacial distribution and wetting before setting. Suitability for such actions characterizes resin glues made from the resins of the present invention. The initial high viscosity resulting from the initial use of a polyvinyl compound, such as polyvinyl alcohol, is maintained during long periods of storage so that formulations of glue made from such resin are possible after long storage of the resin. Such glues minimizes penetration, yet give the desired body for spreading application while having a less advanced resin than normally corresponds to that viscosity. Because the resin is less advanced, the period of fluidity in a heated plywood press is sufficiently prolonged, thus permitting better flow and distribution between plies under pressure, while at the same time the viscosity minimizes penetration, thus making possible high strengths and, in testing, high percentage of wood failure upon rupture of the glue line in shear, either originally dry, or wet or dry after wetting with water.

In formulating a glue for contact with wood or wood fibers, additional strong alkali is desirable for increasing the solubility of the resin in the water present, and for increasing the rapidity of cure, especially in pressing plywood as hereinafter described. The high alkalinity of such formulated resin compositions tends to attack the wood and this alkalinity may be reduced by adding a buffering agent to lower the effective pH of the solution without necessarily changing the content of free alkali. Sodium and potassium carbonates are excellent buffering agents having these properties. However, other agents or salts such as sodium acetate also buffer the alkalinity.

Filler material may be added along with water in formulating a glue. Both water and the filler material reduce the content of resin solids in the glue. Thus, glue cost is decreased, assuming resin solids to be more costly than filler. Water and filler may be added in controlled amounts to give suitable spreading. A small amount of pine oil or other suitable anti-foaming agent may be added to the glue formulation to prevent foaming of the glue in mechanical agitation incident to application, for example, to veneer in forming plywood. The following is an example of a formulation for glue for manufacturing plywood.

*Example IV*

First make a solution of 20 parts of water, 2½ parts of sodium carbonate (anhydrous), and 4 parts of caustic soda. Add solid filler in the amount of 20 parts of material such as walnut shell flour or finely divided silica, to 100 parts of any resin solution made according to the foregoing Examples I and II. Then combine the two mixtures so prepared, and, if desired, add 1½ parts of pine oil.

The additional caustic soda employed in the formulation increases the viscosity and enhances the dispersing power of the glue while thus delaying gelling or precipitation of resin, as in a glue spreader, and thereby avoiding a poorly-spreading glue. In other words, in use of such a glue, complete dispersion of the glue in a liquid form is desired prior to the intended actual advancement of the resin to a solid form, as in a plywood press. All this is additional reason why the original resin composition should not be too highly advanced. The addition of sodium carbonate to the glue along with any other salts in the original resin solution, increases the tendency towards precipitation or gelling. All caustic soda in the glue formulation counteracts this tendency. Carbon dioxide in the air is a factor tending to precipitate resin as it combines with the free NaOH of the resin composition when the glue is exposed in a glue spreader.

In the case of using the resin of Example III wherein polyvinyl acetate is employed in making resin, in the glue formulation of Example IV, less than 4, and from 2 to 3 parts of caustic soda are employed in the above glue formulation of Example IV, because additional caustic soda beyond what is disclosed in the Examples I and II was added to the resin at the time of its completion for storage purposes.

Resin-glue formulations, as above described, are applied to wood veneer and set in presses at elevated temperatures. In the case of three-ply panels each of $\frac{5}{16}$ inch thickness, with two panels together between the heated platens, a press is closed for 7 minutes at 280° F. platen temperature, during which time the resin bonding layers dry and set.

The invention may be carried out with any suitable phenols such as meta or para cresol, and other suitable aldehydes, such as acetaldehyde, which condense to form suitable thermosetting resins which are dispersible in suitable liquid forms, while employing a polyvinyl compound in a dispersed form to give viscosity greater than that derivable in the absence of such polyvinyl compound from the degree of polymerization or advancement of the phenolic-aldehyde condensation product actually present.

Commercial plywood manufactured with the resins described of the present invention has been found to be more uniform and of better bond than that heretofore attained with phenolic resins applied with the same spread of resin solids and pressed under like conditions.

The well-known variations in the phenolic resin art may be employed in carrying out the present invention, without departing from the spirit and scope thereof as expressed in the appended claims.

I claim:

1. The method which comprises heating and condensing to a dissolved water-soluble resin-forming condensation product 1 mole of phenol and about 1.87 moles of formaldehyde in water in the presence of alkali-metal-hydroxide catalyst and in the presence of from about 2 to about 9 parts by weight of polyvinyl alcohol to 100 parts of phenol and conducting said reaction to a stage short of solidification of the mass when cooled to 25° C., thereby providing an alkaline aqueous solution of reactive resin-forming condensation product having viscosity derived in part from the polyvinyl alcohol, forming a film-layer of aqueous liquid glue containing said resin-forming solution as a glue base between layers of solid material including at least one glue-absorbent layer, whereby the viscosity of the glue retards penetration of glue into said layer, and applying heat and mechanical pressure to said layers with said interfacial glue and drying out and thermosetting the resin-forming content thereof.

2. The method of producing plywood which comprises heating and condensing to a dissolved water-soluble resin-forming condensation product 1 mole of phenol and about 1.87 moles of formaldehyde in water in the presence of alkali-metal-hydroxide catalyst and in the presence of from about 2 to about 9 parts by weight of polyvinyl alcohol to 100 parts of phenol and conducting said reaction to a stage short of solidification of the mass when cooled to 25° C., thereby providing an alkaline aqueous solution of reactive resin-forming condensation product having viscosity derived in part from the polyvinyl alcohol, forming a layer of aqueous liquid glue containing said resin-forming solution as a glue base between layers of wood veneer to be united, whereby the viscosity aids in spreading the glue and minimizes penetration of resin into the wood, and applying heat and mechanical pressure to said layers with said interfacial glue and drying out and thermosetting the resin-forming content thereof.

3. The method of producing plywood which comprises heating and condensing to a dissolved water-soluble resin-forming condensation product 1 mole of phenol and about 1.87 moles of formaldehyde in water in the presence of alkali-metal-hydroxide catalyst and in the presence of from about 2 to about 9 parts by weight of polyvinyl alcohol to 100 parts of phenol and conducting said reaction to a stage short of solidification of the mass when cooled to 25° C., thereby providing an alkaline aqueous solution of reactive resin-forming condensation product having viscosity derived in part from the polyvinyl alcohol, formulating an alkaline aqueous liquid glue comprising said resin-forming solution as a glue base, and further comprising alkali-metal hydroxide and a buffer compound for lowering the pH from the pH otherwise resulting from said hydroxide, forming an interface of said liquid glue between layers of wood veneer to be united, whereby the viscosity aids in spreading the glue and minimizes penetration of the glue into the wood, and applying heat and mechanical pressure to said layers with interfacial glue and thermosetting and drying out the resin-forming content thereof.

4. The method of producing plywood which comprises heating and condensing to a dissolved water-soluble resin-forming condensation product 1 mole of phenol and about 1.87 moles of formaldehyde in water in the presence of alkali-metal-hydroxide catalyst and in the presence of from about 2 to about 9 parts by weight of polyvinyl alcohol to 100 parts of phenol and conducting said reaction to a stage short of solidification of the mass when cooled to 25° C., thereby providing an alkaline aqueous solution of reactive resin-forming condensation product having viscosity derived in part from the polyvinyl alcohol, formulating an alkaline aqueous liquid glue comprising said resin-forming solution as a glue base, and further comprising alkali-metal hydroxide, a buffer salt for lowering the pH of the solution from the pH otherwise effected by said hydroxide, and particles of solid filler, forming an interface of said liquid glue between layers of wood veneer to be united, whereby the viscosity aids in spreading the glue and minimizes penetration of the glue into the wood, and applying heat and mechanical pressure to said layers with interfacial glue and drying out and thermosetting the resin-forming content thereof.

5. The method which comprises heating and condensing to a dissolved water-soluble resin-forming condensation product 1 mole of phenol and about 1.87 moles of formaldehyde in water in the presence of alkali-metal-hydroxide catalyst and in the presence of about 2% by weight based on phenol of polyvinyl alcohol and conducting said reaction to a stage short of solidification of the mass when cooled to 25° C., thereby providing an alkaline aqueous solution of reactive resin-forming condensation product having viscosity derived in part from the polyvinyl alcohol, forming a film-layer of aqueous liquid glue containing said resin-forming solution as a glue base between layers of solid material including at least one glue-absorbent layer, whereby the viscosity of the glue retards penetration of glue into said layer, and applying heat and mechanical pressure to said layers with said interfacial glue and drying out and thermosetting the resin-forming content thereof.

6. The method which comprises heating and condensing to a dissolved water-soluble resin-forming condensation product 1 mole of phenol and about 1.87 moles of formaldehyde in water in the presence of alkali-metal-hydroxide catalyst and in the presence of about 2% by weight based on phenol of polyvinyl alcohol and conducting said reaction to a stage short of solidification of the mass when cooled to 25° C., forming a layer of aqueous liquid glue containing said resin-forming solution as a glue base between layers of wood to be united, whereby the viscosity aids in spreading the glue and minimizes penetration of resin into the wood, and applying heat and mechanical pressure to said layers with said interfacial glue and drying out and thermosetting the resin-forming content thereof.

7. The method which comprises heating and condensing to a dissolved water-soluble resin-forming condensation product 1 mole of phenol and about 1.87 moles of formaldehyde in water in the presence of alkali-metal-hydroxide catalyst and in the presence of from about 2 to about 9 parts by weight of polyvinyl alcohol to 100 parts of phenol and conducting said reaction to a stage short of solidification of the mass when cooled to 25° C., thereby providing an alkaline aqueous solution of reactive resin-forming condensation product having viscosity derived in part from the polyvinyl alcohol, forming a layer of aqueous liquid glue containing said resin-forming solution as a glue base between layers of wood to be united, whereby the viscosity aids in spreading the glue and minimizes penetration of resin into the wood, and applying heat and mechanical pressure to said layers with said interfacial glue and drying out and thermosetting the resin-forming content thereof.

RAYMOND G. BOOTY.

REFERENCES CITED

The following references are of record in the file of this patent:

UNITED STATES PATENTS

| Number | Name | Date |
|---|---|---|
| 1,917,020 | Dent | July 4, 1933 |
| 1,919,163 | Jackson | July 18, 1933 |
| 2,111,006 | Robie | Mar. 15, 1938 |
| 2,150,697 | Nevin | Mar. 14, 1939 |
| 2,150,698 | Nevin | Mar. 14, 1939 |
| 2,178,566 | Dike et al. | Nov. 7, 1939 |
| 2,218,373 | Alexander | Oct. 15, 1940 |
| 2,223,392 | Smith | Dec. 3, 1940 |
| 2,233,875 | Schmidt et al. | Mar. 4, 1941 |
| 2,351,716 | Smith | June 20, 1944 |
| 2,360,376 | Van Epps | Oct. 17, 1944 |
| 2,392,686 | Murdock | Jan. 8, 1946 |

FOREIGN PATENTS

| Number | Country | Date |
|---|---|---|
| 361,910 | Great Britain | Nov. 16, 1931 |
| 542,286 | Germany | Jan. 22, 1932 |

OTHER REFERENCES

"PVA Polyvinyl Alcohol," pp. 1-5, pub. 1940 by R and H Chemicals Dept., Du Pont, Wilmington, Del.

The Merck Index, 5th ed., p. 512, pub. 1940 by Merck & Co., Inc., Rahway, N. J.